United States Patent [19]

Tirpak et al.

[11] 4,133,797

[45] Jan. 9, 1979

[54] MINERAL-FILLED, HIGH IMPACT POLYOLEFIN MOLDING COMPOSITIONS

[75] Inventors: Michael R. Tirpak, Maywood; James J. Schouten, Glen Ellyn; Charles E. Green, Brookfield, all of Ill.

[73] Assignee: The Richardson Company, Des Plaines, Ill.

[21] Appl. No.: 711,051

[22] Filed: Aug. 4, 1976

Related U.S. Application Data

[63] Continuation of Ser. No. 493,794, Aug. 1, 1974, abandoned.

[51] Int. Cl.² .............................................. C08K 3/34
[52] U.S. Cl. ............................ 260/42.46; 260/897 A; 429/176
[58] Field of Search ..................... 260/897 A, 42.46

[56] References Cited

U.S. PATENT DOCUMENTS

| 3,036,987 | 5/1962 | Ranalli | 260/897 |
| 3,578,629 | 5/1971 | McManimie | 260/42.46 |
| 3,956,230 | 5/1976 | Gaylord | 260/42.46 |

FOREIGN PATENT DOCUMENTS 1110930  4/1968  United Kingdom.

OTHER PUBLICATIONS

Oleesky et al., Handbook of Reinforced Plastics, 1964, Reinhold Pub. Corp., New York, pp. 194, 195, 200, 231.

Primary Examiner—James H. Derrington
Attorney, Agent, or Firm—Lockwood, Dewey, Alex & Cummings

[57] ABSTRACT

This invention relates to thermoplastic molding compositions suitable for molding or extruding articles such as thin-walled battery containers which possess high heat distortion temperatures and which also simultaneously possess excellent impact resistance at low temperature.

51 Claims, No Drawings

MINERAL-FILLED, HIGH IMPACT POLYOLEFIN MOLDING COMPOSITIONS

This is a continuation of application Ser. No. 493,794, filed Aug. 1, 1974, now abandoned.

Filled thermoplastics are well known and include a wide variety of polymeric compositions such as polyolefins which contain diverse filler materials. Typically the filler materials are incorporated into the thermoplastic polymers in order to modify or enhance their physical properties, such as tensile strength, flexibility or stiffness and often also as an extender to lessen the quantity of polymer required for any given molding application. For example, thermoplastic polyolefins, such as polypropylene, have been prepared utilizing such filler materials as glass fibers or minerals such as talc so as to extend the polypropylene and also to obtain certain desirable physical properties such as high heat distortion temperatures and improved rigidity. While such filler materials enhance the high temperature performance and rigidity of such polyolefins as polypropylene, they typically do so at the expense or loss of other physical properties and especially impact resistance at low temperatures.

Many molding or extrusion applications, however, do require both high heat performance and high impact resistance at low temperatures. One such application, where polypropylene is extensively employed, is the injection molding of modern battery containers having relatively thin closure walls of less than 0.1 inch which are employed for automotive lead-acid storage batteries. These battery containers are usually employed in the engine compartment of automotive vehicles which, due to certain demands of high engine performance and environmental considerations are being maintained at ever increasing temperatures and frequently in excess of 300° F. Such high temperature environments for these batteries accordingly requires that such battery container have a high temperature stability. Such battery containers, moreover, are also subject to extremely low, ambient temperatures during use which adds the additional requirement that such battery containers have suitable low temperature physical properties such as impact resistance in order that such battery containers be of commercial value.

Utilization of filler materials in thermoplastic polyolefins and particularly the polypropylene materials employed for applications such as battery containers has, however generally been impractical because while such filler materials will typically induce the desired high temperature performance they do so with the concomitant loss of the desired low temperature properties such as impact resistance. This, in effect, renders such filled thermoplastics of little practical value in such applications.

It has now been discovered, however, that certain materials and specifically anhydrous alumino silicates may be employed as a type of filler in thermoplastic compositions such as polypropylene blends in order to provide a moldable composition which is capable of producing molded articles having both the desired high temperature performance and simultaneously the desired low temperature properties such as impact resistance.

Accordingly, an object of this invention is to provide a thermoplastic molding composition capable of shaping articles having both high heat stability and excellent impact resistance at low temperatures. Another object is to provide such molding composition comprising a blend of an elastomeric polymer such as an ethylene copolymer and a polyolefin such as propylene homopolymer containing a finely divided anhydrous alumino silicate. A further object is to provide a molding composition of a blend of propylene homopolymer and ethylene propylene copolymer which contains feldspar. A still further object is to provide molded articles formed from such molding composition having both high heat performance properties and high impact resistance at low temperatures. An additional object is to provide a molded, battery container from such molding composition which is particularly suitable for use under varying temperature conditions. These and other objects of this invention will be apparent from the following further detailed description thereof.

In its basic embodiment the thermoplastic molding composition of this invention, which is particularly suitable for shaping articles having high heat stability with high impact resistance at low temperature, comprises a blend of an elastomeric polymer and a polyolefin which contains a finely divided anhydrous alumino silicate. As previously discussed, the anhydrous alumino silicate, when incorporated into the thermoplastic composition induces and creates the desired combination of properties in articles molded from such composition and in particular high temperature stability simultaneously with low temperature impact resistance.

The anhydrous alumino silicates which may be employed in accordance with this invention for such purpose are anhydrous alumino silicates which may be either synthetic or more preferably naturally occurring mineral materials derived from such ore bodies as granite. Such anhydrous alumino silicates typically exist in a complex form with one or more alkali or alkaline earth metals, usually as oxides, and include, for example, one or more metals of sodium, potassium, calcium or barium. Included within this class of anhydrous alumino silicates are such materials as feldspar and feldsparic materials such as potash feldspars, for example orthoclase and microcline; plagioclase feldspars including sodium feldspars such as albite and calcium feldspars such as anorthite; or sodium and calcium feldspars such as oligoclase, andesine and labradorite as well as various other feldsparic minerals such as nepheline, nepheline syenite or alpite.

Of the various anhydrous alumino silicates which may be employed feldspar is the preferred material and particularly the naturally occurring feldsparic, anhydrous sodium potassium aluminum silicates and the feldsparic, anhydrous sodium potassium and calcium alumino silicates such as anorthoclase. Typically the alumino silicates contain silicates calculated as silicon dioxide (SiO) in excess of 50 weight percent or more usually above 60 weight percent and aluminum calculated as aluminum oxide ($Al_2O_3$) usually above about 10 and more usually above about 12 weight percent. The balance of the anhydrous alumino silicate typically comprises a predominance of the alkali or alkaline earth metals and minor amounts of other trace metals. For example, the alkali or alkaline earth metals calculated as oxides usually constitute from above about 5 or more usually above about 15 weight percent of the alumino silicate. Examples of anhydrous alumino silicates which are suitable for use in the present invention have the following typical chemical analysis in weight percent:

| Silicon dioxide | (SiO) | 61 | 67.8 | 76.3 |
| Aluminum oxide | (Al$_2$O$_3$) | 23 | 19.4 | 14.3 |
| Iron oxide | (Fe$_2$O$_3$) | trace | 0.08 | 0.08 |
| Titanium oxide | (TiO$_2$) | nil | trace | trace |
| Calcium oxide | (CaO) | 0.7 | 1.7 | 1.2 |
| Magnesium oxide | (MgO) | trace | trace | trace |
| Sodium oxide | (Na$_2$O) | 9.8 | 7.0 | 5.1 |
| Potassium oxide | (K$_2$O) | 4.6 | 3.8 | 2.8 |
| Manganese oxide | (MnO) | nil | none | none |
| Copper oxide | (CuO) | nil | none | none |
| Ignition loss | | 0.6 | 0.2 | 0.2 |

The anhydrous alumino silicates such as feldspar which may be used in accordance with the present invention are readily available commercially from a variety of different sources. For example anhydrous, sodium, potassium and calcium alumino silicates are sold under such trade designations as LU-340 by Lawson United Feldspar Mineral Company of Spruce Pine, North Carolina and anhydrous, sodium potassium alumino silicates are sold under such trade names as Minex by American Nepheline Corporation of Columbus, Ohio.

The anhydrous alumino silicates which improve the properties of thermoplastic compositions in accordance with this invention, in certain particularly preferred embodiments, may possess additional and desired characteristics involving such properties as particle size, hardness and absorptivity. In general the alumino silicates must be in a finely divided state and suitably have an average particle size within the range of from about 4 to 25 microns with a more limited range of from about 6 to about 15 microns being generally preferred, particularly when employing such alumino silicates as feldspar. The particular particle size chosen within this range may, of course, be varied somewhat depending upon the particular thermoplastic composition and level of alumino silicate employed as well as the particular properties desired for the molded article and moldability of the composition. Generally, however, as the particle size is reduced within this range the impact resistance decreases somewhat and as the particle size is increased the particular final molded article tends to have a more abrasive surface.

The hardness of the particular anhydrous alumino silicate also may generally influence the ultimate properties of the articles molded from the thermoplastic molding compositions and in general the alumino silicate should have a hard surface and preferably within the range of from about 5.0 to 6.5 cn the Mohs' scale with a more limited range of from about 6.0 to 6.5 generally being suitable under most circumstances. In addition and in certain especially preferred embodiments the alumino silicate should additionally have a surface with a relatively low absorptivity, that is a surface which is not highly absorbent so as to absorb the thermoplastic composition and more particularly the elastomeric polymer component thereof onto its surface. Accordingly, such alumino silicates advantageously have absorptivities in terms of oil absorption in accordance with ASTM Method D 281 of generally less than 30 to 40 pounds of oil per hundred pounds of alumino silicate and typically within the range of from about 12 to about 30 pounds of oil per hundred pounds of the anhydrous alumino silicate.

The anhydrous alumino silicates of the above description and in accordance with this invention, are incorporated into a blend or mixture of an elastomeric polymer and a polyolefin to form the thermoplastic molding composition of this invention. The polyolefins which may be employed for such purpose and particularly to ultimately produce molded articles having the desired combination of high heat performance and desirable low temperature impact resistance include homopolymers or copolymers of olefins having from 2 to about 4 carbon atoms per molecule. These olefins include, for example, ethylene, propylene or butylene forming such homopolymers as polyethylene, polypropylene or polybutylene. Certain copolymers of the monomeric olefins may also be employed and include, for example, copolymers of ethylene and propylene. Of the various olefin copolymers or homopolymers which may be employed, however, the homopolymers are preferred and particularly a homopolymer of propylene and especially when employed to form molding compositions for such molded articles as battery containers where the unique combination of high temperature performance and low temperature impact resistance is of essential importance.

The elastomeric polymer which is combined with the polyolefin to form the blend or mixture into which the alumino silicate is incorporated to form the thermoplastic composition of this invention includes homopolymers, copolymers or terpolymers of 1-olefins or α-olefins, that is where the olefinic double bond is on a terminal carbon atom, having from 2 to about 6 carbon atoms per molecule. Examples of suitable monomers for forming the elastomeric polymer include ethylene, propylene or 1-butylene. While the elastomeric polymer may be either a homopolymer of such monomeric olefins, for example polyethylene, polypropylene or polybutylene or various mixtures thereof and especially when such homopolymers have from 2 to about 4 carbon atoms per molecule, the preferred elastomeric polymer is a copolymer and particularly copolymers of ethylene, for example ethylene-propylene copolymer or ethylene-butylene copolymer or copolymers of propylene, for example propylene-butylene or propylene-hexene-1 especially where the olefinic comonomer with propylene induces desirable elastomeric properties. The copolymers of ethylene-propylene are, however, especially preferred particularly for use in molding articles such as battery containers so as to create the desired combination of properties in accordance with this invention. Advantageously, such ethylene copolymers contain a preponderance of ethylene to induce desirable elastomeric characteristics with the ethylene suitably ranging above 50 weight percent of the copolymer and with a copolymer of ethylene propylene having about 80 weight percent ethylene and about 20 weight percent propylene being typical.

The particular elastomeric polymer selected for combination with the polyolefin may, of course, be varied and will be a function of the desired properties of the molding composition and the particular articles to be molded from such molding composition. The elastomeric polymer and the polyolefin will, of course, be dissimilar materials and generally when, for example preparing battery containers by injection molding, the preferred elastomeric polymer is an ethylene copolymer such as ethylenepropylene copolymer and particularly when combined with propylene homopolymer and feldspar so as to form a preferred molding composition of this invention.

In general the thermoplastic molding composition of this invention may be prepared by simply mixing the elastomeric polymer, the polyolefin and the anhydrous alumino silicate alone or together with other suitable ingredients such as color pigments under suitable mixing and blending conditions so as to form the desired molding composition. The proportions of the composition components may be varied depending upon such factors as the specific elastomeric polymer, polyolefin and alumino silicate utilized as well as the desired molding properties for such composition and in addition the properties desired for the articles molded from such composition. In general and in order to obtain the desired properties in accordance with this invention, the elastomeric polymer should be present within the range of from about 5 to about 25 weight percent of the composition; the polyolefin should be present within the range of from about 25 to about 80 weight percent of the composition; and the anhydrous alumino silicate should be present within the range of from about 10 to about 50 weight percent of the composition. More limited ranges are generally preferred, however, and especially with the preferred molding compositions utilized for the injection molding of battery containers where the unique combination of high heat stability and low temperature impact resistance is particularly required. For example and when utilizing such preferred components as propylene homopolymer as the polyolefin, ethylene copolymer as the elastomeric polymer and feldspar as the alumino silicate, the elastomeric polymer should be present within the range of from about 8 to about 20 weight percent of the composition; the polyolefin should be present within the range of from about 35 to about 67 weight percent of the composition and the alumino silicate should be present within the range of from about 25 to about 45 weight percent of the composition.

The specific proportions of the various molding composition components can, of course, be varied within these broad and preferred ranges in order to obtain different molding properties for the composition as well as different properties for the molded articles prepared from such molding composition. For example when employing the preferred molding compositions of this invention for use in preparing thin-walled battery containers a particularly suitable composition for obtaining the desired combination of physical properties comprises about 60 weight percent of propylene homopolymer, about 10 weight percent of ethylene-propylene copolymer and about 30 weight percent of feldspar.

In mixing or blending the various components to form the molding composition a variety of different conventional techniques may be suitably employed depending upon the particular physical form of the various components, for example whether the polyolefin and/or elastomer is in powder or pellet form, the level of alumino silicate to be incorporated and whether the molding composition is to be employed in compression or injection molding or in extrusion applications. In a relatively simple procedure and when the components are advantageously in powder form the components are basically added to a suitable mixer in the desired proportions and then mixed for a period sufficient to obtain the desired degree of dispersion or blending of the components. The molding composition thus mixed may then be directly employed in a molding or extrusion operation. Generally, however, it is usually desirable to further mix or blend the components to obtain a higher desired degree of dispersion or intermixing of the components. For example, after the components are mixed, the mixture may then be charged to a suitable extruder and extruded therein under elevated temperature and pressure to obtain a further mixing and blending of the components. The strand extrudate thus produced can then be cut in accordance with standard procedures into pellet form and the pellets then may be conveniently and suitably employed in conventional compression, or injection molding or extrusion apparatus to form the desired molded article.

As indicated, the thermoplastic molding compositions of this invention may be employed to form articles having both high heat stability, for example, high heat distortion temperatures and desirable low temperature properties such as impact resistance. Such articles may be formed from the molding compositions of this invention through utilization of conventional procedures under elevated temperatures and pressure using either injection or compression molding or extrusion techniques. Such articles can, of course, be of any desired shape or configuration and will be particularly suitable for applications in environments where there is a variation in temperature. One particularly suitable application, and as previously discussed, is in the modern thin-walled battery container employed in automobile applications particularly because such containers when formed from the compositions of this invention possess the desired combination of the high heat stability necessary for use under elevated temperatures in engine compartments and also the high impact resistance necessary at low temperatures to protect against impact breakage. For example, the articles molded from the compositions of this invention generally have heat distortion temperatures, that is deflection temperatures, generally in excess of 220° F. under 66 pounds per square inch loading when evaluated in accordance with ASTM method D 648-56 and impact resistance at 0° F. generally in excess of 30 and often above 60 and frequently above 100 inch pounds as determined by the falling ball method of ASTM Test D-639-72.

The thermoplastic molding compositions of this invention are moreover especially suitable for use in preparing battery containers by injection molding techniques because in addition to having the desired combination of high and low temperature properties they further possess a particularly desirable combination of other properties essential for successful use in preparing and using lead-acid storage batteries. For example the presence of the anhydrous alumino silicate within the molding composition increases the thermal conductivity of the molding composition which allows a fast heating of the molding composition to a fluid state and a quick cooling and solidification of the molded article during the injection molding operation. This permits, for example, much faster injection molding cycles which, aside from the benefits of economical operation, also lessens any material stresses when injection molding complex shaped articles such as thin-walled, multi-partitioned battery containers especially where the side walls and partitions because of their excessive length must be formed in deep mold cavities where excellent melt flow properties for the molding composition must exist. In addition the molding compositions of this invention further produce molded articles with a desirable degree of rigidity. This, in the case of thin-walled battery containers, reduces the the bulging or flexing of the relatively thin walls and partitions and prevents destruction of the container during operation. These molding compositions, moreover, because of the relatively inert nature of the anhydrous alumino silicate are particularly resistant to the deleterious effects of battery acids and, unlike many conventional filler materials, also do not absorb excessive amounts of such acids so as to cause a weakening of the container and/or interference with the battery performance. This relative inertness of the alumino silicate further serves to avoid any adverse interaction or interference with the coloring pigments conventionally employed in thermoplastics which allows ready coloring of the molding compositions of this invention with such conventional pigments so as to produce, in the case of battery containers, a wide variety of commercially desirable colors and markings.

The following examples are offered to illustrate the thermoplastic molding compositions of this invention, the preparation thereof and their utilization in preparing certain molded articles such as battery containers. These examples are not intended to limit the general scope of this invention in strict accordance therewith.

EXAMPLE I

A series of thermoplastic molding composition samples were prepared in accordance with this invention as follows and were then utilized to injection mold thin-walled battery containers according to the indicated procedure:

The composition samples were dry blended by adding the components in the indicated weight percents to a suitable mixer.

| Sample No. | 1 | 2 | 3 | 4 | 5 |
|---|---|---|---|---|---|
| Component | \multicolumn{5}{c}{Weight Percent} | | | | |
| Propylene homopolymer, dry powder (Exxon CD-481) | 55 | 60 | 57.5 | 45 | 50 |
| Ethylene-propylene copolymer, pellets (Exxon MD-702) | 15 | 10 | 12.5 | 15 | 20 |
| Anhydrous, sodium, potassium and calcium alumino silicate feldspar, powder having a mean particle size of 9 microns and an oil absorptivity of 18 to 19 lb/oil per lb of alumino silicate (Lawson United LU-340) | 30 | 30 | 30 | 40 | 30 |

After the components were thoroughly mixed the composition samples were extruded and cut into pellets and the pellets thus formed for each sample were employed to injection mold a multipartitioned thin-walled battery container having bottom and side closure wall thicknesses of less than 0.1 inches and partitions and closure walls of about 8 inches in height.

Portions of the closure walls were obtained from the container molded from each sample composition and the heat distortion temperature and low temperature impact resistance were determined as follows with the indicated results.

| Sample No. | 1 | 2 | 3 | 4 | 5 |
|---|---|---|---|---|---|
| Deflection temperature, °F at 66 psi (ASTM Method D-648-56) | 240 | 233 | 232 | 224 | 221 |
| Impact Resistance at 0° F by the falling ball method, inch-pounds (1) | above 100 | 68 | 81 | 82 | above 100 |

The injection molded battery container molded from sample composition No. 1 was also subjected to the following tests to establish its suitability for employment as a container for lead-acid storage batteries with the indicated results.

| Bulge at 200° F (ends), inches (2) | 0.1 |
|---|---|
| Acid absorption, mg/sq inch (2) | .09 after 7 days |
| Dielectric, volts/mil (2) | greater than 505 |

(1) Inches of height that a missile falls before damage is observed in accordance with procedures of ASTM Test D-639-72.
(2) Procedures of ASTM Test D-639-72.

All of the above values for the indicated test were equal to or in excess of the values generally recognized as basically required for lead-acid, storage battery containers.

EXAMPLE II

A thermoplastic molding composition was prepared having the components and proportions corresponding to Sample 1 of Example I and in accordance with the procedures described therein. The pelletized composition was then injection molded into a flat sheet. A second corresponding molding composition was similarly prepared but without the anhydrous alumino silicate specified in Example I and was also pelletized and injection molded into a flat sheet. Heat distortion temperatures were determined for each sample with the following results illustrating the gain in heat distortion temperature by incorporating the anhydrous alumino silicate.

| Deflection temperature, °F at 66 psi (ASTM D-648-52) containing the anhydrous alumino silicate | 254° |
|---|---|
| Deflection temperature, °F at 66 psi (ASTM D-648-52) without the anhydrous alumino silicate | 228° |

EXAMPLE III

Thermoplastic molding compositions were prepared containing certain mineral materials different from the anhydrous alumino silicates of the present invention as follows and were employed to injection mold thin-walled battery containers according to the procedures of Example I.

The molding compositions had the following formulations.

| Sample No. | 6 | 7 |
|---|---|---|
| Components | \multicolumn{2}{c}{Weight Percent} | |
| Propylene homopolymer, powder (Exxon CD-481) | 65 | 60 |
| Ethylene-propylene copolymer, pellets (Exxon MD-702) | 10 | 10 |
| Anhydrous Calcium Sulfate (Snow White-United States) gypsum having a mean particle size of 5.5 microns | 25 | — |
| Talc, powder (anhydrous magnesium silicate) having a mean particle size of 5 microns | — | 30 |

Battery containers were injected molded using the composition Samples 6 and 7 in accordance with the procedure of Example I and the closure walls of the containers so prepared had the following heat distortion temperature and impact resistance.

| Sample | 6 | 7 |
|---|---|---|
| Deflection temperature, °F at 66 psi (ASTM D-648-56) | 251 | 271 |
| Impact resistance at 0° F, | | |

-continued

| Sample | 6 | 7 |
|---|---|---|
| inch pounds | below 10 | below 10 |

As may be observed from the above data and the data for composition Samples 1 through 5 all of the Samples 1 through 7 possessed the desired high heat properties resulting from incorporating the various mineral materials into the thermoplastic. The compositions of the present invention, however, namely Samples 1 through 5 also possessed the highly desirable impact properties at low temperature. Compare in particular the impact properties for Samples 6 and 7 with that of Sample 2 having a comparable formulation except for the particular mineral employed. In Samples 6 and 7, using calcium sulfate and talc respectively, the impact values are less than 10 inch-pounds whereas with Sample 2 employing a feldsparic, anhydrous alumino silicate the impact resistance is in excess of 60 inch-pounds. This impact resistance in combination with the high heat property does, of course, render the molding compositions containing the anhydrous alumino silicate of unique value in such applications as multipartitioned containers for lead-acid storage batteries where structural stability over a wide temperature range is a critical requirement.

We claim:

1. A thermoplastic molding composition suitable for forming articles having high heat stability with high impact resistance at low temperature consisting essentially of a blend of an elastomeric polymer of 1-olefins and a thermoplastic polyolefin containing a finely divided feldsparic anhydrous alumino silicate, said elastomeric polymer being present in an amount of from about 10 weight percent to about 20 weight percent.

2. The composition of claim 1 wherein the polyolefin is a homopolymer or copolymer of an olefin having from 2 to about 4 carbon atoms per molecule.

3. The composition of claim 2 wherein the polyolefin is a propylene homopolymer.

4. The composition of claim 1 wherein the elastomeric polymer is a homopolymer or copolymer of a 1-olefin having from 2 to about 6 carbon atoms per molecule.

5. The composition of claim 1 wherein the elastomeric polymer is a copolymer of ethylene.

6. The composition of claim 1 wherein the elastomeric polymer is a copolymer of ethylene and propylene.

7. The composition of claim 1 wherein the elastomeric polymer is a copolymer of propylene and a comonomer selected from butylene and hexene-1.

8. The composition of claim 1 wherein the polyolefin is present within from about 25 to 80 weight percent of the composition.

9. The composition of claim 1 wherein the elastomeric polymer is a copolymer of ethylene-propylene and the polyolefin is propylene homopolymer.

10. The composition of claim 9 wherein the propylene homopolymer is present within the range of from about 35 to about 67 weight percent of the composition.

11. The composition of claim 1 wherein the feldsparic alumino silicate is an anhydrous aluminum silicate combined with at least one metal selected from the group consisting of an alkali or alkaline earth metal.

12. The composition of claim 11 wherein the metal is at least one metal of calcium, sodium, potassium or barium.

13. The composition of claim 1 wherein the feldsparic alumino silicate is feldspar.

14. The composition of claim 1 wherein the anhydrous feldsparic alumino silicates contain aluminum calculated as $Al_2O_3$ in excess of about 10 weight percent, silicates calculated as SiO in excess of about 50 weight percent and one or more alkali or alkaline earth metal calculated as an oxide in excess of about 5 weight percent of the alumino silicate.

15. The composition of claim 11 wherein the feldsparic alumino silicate has an average particle size of from about 4 to about 25 microns.

16. The composition of claim 15 wherein the feldsparic alumino silicate has an average particle size of from about 6 to about 15 microns.

17. The composition of claim 11 wherein the feldsparic alumino silicate has a Mohs' hardness of from about 5.0 to about 6.5 and an oil absorptivity of from about 12 to about 30 pounds of oil per pound of the alumino silicate.

18. The composition of claim 1 wherein the feldsparic alumino silicate is present within the range of from about 10 to about 50 weight percent of the composition.

19. The composition of claim 11 wherein the feldsparic alumino silicate is present within the range of from about 20 to about 45 weight percent of the composition.

20. The composition of claim 9 wherein the feldsparic alumino silicate is feldspar present within the range of from about 25 to about 45 weight percent of the composition, the propylene homopolymer is present within the range of from about 35 to about 67 weight percent of the composition.

21. The composition of claim 1 wherein the composition is moldable to form molded articles having a heat distortion temperature above about 220° F. and an impact resistance by the falling ball method at 0° F. above about 30 inch-pounds.

22. An article having high heat stability with high impact resistance at low temperature, such article being formed from a thermoplastic molding composition consisting essentially of a blend of an elastomeric polymer of 1-olefins and a thermoplastic polyolefin containing a finely divided feldsparic anhydrous alumino silicate, said elastomeric polymer being present in an amount of from about 10 weight percent to about 20 weight percent.

23. The article of claim 22 wherein the polyolefin is a homopolymer or copolymer of an olefin having from 2 to about 4 carbon atoms per molecule.

24. The article of claim 23 wherein the polyolefin is a propylene homopolymer.

25. The article of claim 22 wherein the elastomeric polymer is a homopolymer or copolymer of a 1-olefin having from 2 to about 6 carbon atoms per molecule.

26. The article of claim 25 wherein the elastomeric polymer is a copolymer of ethylene.

27. The article of claim 22 wherein the elastomeric polymer is a copolymer of ethylene and propylene.

28. The article of claim 22 wherein the elastomeric polymer is a copolymer of propylene and a comonomer selected from butylene and hexene-1.

29. The article of claim 22 wherein the polyolefin is present within from about 25 to 80 weight percent of the composition.

30. The article of claim 22 wherein the elastomeric polymer is a copolymer of ethylene-propylene and the polyolefin is propylene homopolymer.

31. The article of claim 30 wherein the propylene homopolymer is present within the range of from about 35 to about 67 weight percent of the composition.

32. The article of claim 22 wherein the feldsparic alumino silicate is an anhydrous aluminum silicate combined with at least one metal selected from the group consisting of an alkali or alkaline earth metal.

33. The article of claim 32 wherein the metal is at least one metal of calcium, sodium, potassium or barium.

34. The article of claim 22 wherein the feldsparic alumino silicate is feldspar.

35. The article of claim 32 wherein the anhydrous feldsparic alumino silicates contain aluminum calculated as $Al_2O_3$ in excess of about 10 weight percent, silicates calculated as $SiO$ in excess of about 50 weight percent and one or more alkali or alkaline earth metal calculated as an oxide in excess of about 5 weight percent of the alumino silicate.

36. The article of claim 32 wherein the feldsparic alumino silicate has an average particle size of from about 4 to about 25 microns.

37. The article of claim 32 wherein the feldsparic alumino silicate has an average particle size of from about 6 to about 15 microns.

38. The article of claim 32 wherein the feldsparic alumino silicate has a Mohs' hardness of from about 5.0 to about 6.5 and an oil absorptivity of from about 12 to about 30 pounds of oil per pound of the alumino silicate.

39. The article of claim 22 wherein the feldsparic alumino silicate is present within the range of from about 10 to about 50 weight percent of the composition.

40. The article of claim 22 wherein the feldsparic alumino silicate is present within the range of from about 25 to about 45 weight percent of the composition.

41. The article of claim 22 wherein the feldsparic alumino silicate is feldspar present within the range of from about 25 to about 45 weight percent of the composition, the polyolefin is propylene homopolymer present within the range of from about 35 to about 67 weight percent of the composition.

42. The article of claim 22 wherein such composition is moldable to form molded articles having a heat distortion temperature above about 220° F. and an impact resistance by the falling ball method at 0° F. above about 30 inch pounds.

43. A thermoplastic molding composition suitable for forming articles having high heat stability with high impact resistance at low temperature consisting essentially of a blend of propylene homopolymer and an elastomeric ethylene-propylene copolymer containing a finely divided feldsparic anhydrous alumino silicate wherein the feldsparic alumino silicate is present in the blend within the range of about 10 to about 50 weight percent and has an oil absorptivity of from about 12 to 30 pounds of oil per hundred pounds of the feldsparic alumino silicate and a Mohs' hardness of from about 5.0 to about 6.5, the blend contains substantially propylene homopolymer within the range of from about 35 to about 67 weight percent, and the elastomeric ethylene-propylene copolymer is present within the range of from about 10 to 20 weight percent of the blend.

44. An article having high heat stability with high impact resistance at low temperature such article being formed from a thermoplastic molding composition consisting essentially of a blend of propylene homopolymer and an elastomeric ethylene-propylene copolymer containing a finely divided feldsparic anhydrous alumino silicate wherein the feldsparic alumino silicate is present in the blend within the range of about 10 to about 50 weight percent and has an oil absorptivity of from about 12 to 30 pounds of oil per hundred pounds of the feldsparic alumino silicate and a Mohs' hardness of from about 5.0 to about 6.5, the blend contains substantially propylene homopolymer within the range of from about 35 to about 67 weight percent, and the elastomeric ethylene-propylene copolymer is present within the range of from about 10 to 20 weight percent of the blend.

45. A method of providing both high heat stability and high impact resistance at low temperatures to a thermoplastic molding composition blend of thermoplastic polyolefin and an elastomeric polymer of 1-olefins, said method comprising incorporating from about 10 to about 50 weight percent of a finely divided untreated feldsparic anhydrous alumino silicate into said blend, said elastomeric polymer being present in an amount of from about 10 weight percent to about 20 weight percent.

46. The method of claim 45 wherein said thermoplastic polyolefin is selected from the group consisting of homopolymers and copolymers of olefins having from 2 to about 4 carbon atoms.

47. The method of claim 45 wherein said thermoplastic polyolefin is propylene homopolymer.

48. The method of claim 45 wherein said elastomeric polymer is selected from the group consisting of homopolymers, copolymers and terpolymers of 1-olefins having from 2 to about 5 carbon atoms per molecule.

49. The method of claim 45 wherein said elastomeric polymer is an ethylene-propylene copolymer.

50. The method of claim 45 wherein said thermoplastic polymer is propylene homopolymer and said elastomeric polymer is an ethylene-propylene copolymer.

51. The method of claim 50 wherein said propylene homopolymer is present in an amount of from about 35 to about 67 weight percent of said blend.

* * * * *